United States Patent
Reed et al.

(10) Patent No.: US 11,373,236 B1
(45) Date of Patent: Jun. 28, 2022

(54) LOAN REFINANCING AND/OR CONSOLIDATION TOOL

(71) Applicant: Wells Fargo Bank, N.A., San Francisco, CA (US)

(72) Inventors: Hayes Patrick Reed, Sacramento, CA (US); Jason Michael Reiter, Westminster, CO (US); Steven Michael Schuler, Clive, IA (US); Donna Syrovatka, Sioux Falls, SD (US); Jane Turpin, Waukee, IA (US); Aaron John Ziegler, Minneapolis, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 163 days.

(21) Appl. No.: 16/179,347

(22) Filed: Nov. 2, 2018

(51) Int. Cl.
  *G06Q 40/00* (2012.01)
  *G06Q 40/02* (2012.01)
(52) U.S. Cl.
  CPC .................. *G06Q 40/025* (2013.01)
(58) Field of Classification Search
  CPC ............... G06Q 40/00; G06Q 40/08
  See application file for complete search history.

(56) References Cited

U.S. PATENT DOCUMENTS

| | | | |
|---|---|---|---|
| 7,089,503 B1 | 8/2006 | Bloomquist et al. | |
| 7,542,921 B1 * | 6/2009 | Hildreth | G06Q 30/0601 705/26.1 |
| 7,574,401 B1 * | 8/2009 | Burns | G06Q 40/02 705/38 |
| 7,676,410 B2 | 3/2010 | Petralia | |
| 7,747,525 B2 | 6/2010 | Grant et al. | |
| 7,885,889 B2 * | 2/2011 | Oppenheimer | G06Q 20/10 705/35 |
| 7,925,580 B2 | 4/2011 | Brasch | |
| 8,433,631 B1 * | 4/2013 | An | G06Q 40/00 705/35 |
| 8,788,404 B1 * | 7/2014 | Christopolous | G06Q 40/06 705/38 |

(Continued)

OTHER PUBLICATIONS

N. Baum et al. (eds.), The Complete Business Guide for a Successful Medical Practice (2015) (Year: 2015).*
"Student Loan Hero Unveils Innovative New Tools to Help 43 Million Borrowers Navigate Confusing Repayment Options," Financial Services Monitor Worldwide, Amman: SyndiGate Media Inc. (May 19, 2016), Copyright © 2018 ProQuest LLC, 2 pages.

(Continued)

*Primary Examiner* — Scott C Anderson
*Assistant Examiner* — Xavier M. Bennett
(74) *Attorney, Agent, or Firm* — Merchant & Gould P.C.

(57) ABSTRACT

A method for processing requests to consolidate loans includes receiving, from one or more third party electronic computing devices, information regarding outstanding loans for a user that are issued by one or more third party lenders. The information is sent to a user electronic computing device. A selection is received of loans the user wishes to refinance or consolidate. A benefits analysis is performed for the loans. Based on the benefits analysis, a determination is made of whether any of the outstanding loans can be consolidated, and whether any of the loans are excluded from being consolidated. Consolidated loan information is sent to the user electronic computing device regarding a consolidated loan for any of the loans that can be consolidated. Exclusion information is sent to the user electronic computing device regarding any of the loans that are excluded from being consolidated.

13 Claims, 11 Drawing Sheets

(56) References Cited

U.S. PATENT DOCUMENTS

| | | | |
|---|---|---|---|
| 9,672,487 B1* | 6/2017 | Garcia | G06Q 10/0633 |
| 2003/0033242 A1* | 2/2003 | Lynch | G06Q 40/00 |
| | | | 705/38 |
| 2003/0036995 A1* | 2/2003 | Lazerson | G06Q 30/02 |
| | | | 705/38 |
| 2003/0097329 A1* | 5/2003 | Nabe | G06Q 20/105 |
| | | | 705/38 |
| 2003/0191702 A1 | 10/2003 | Hurley | |
| 2005/0004860 A1 | 1/2005 | Pretell et al. | |
| 2005/0097033 A1* | 5/2005 | Pretell | G06Q 40/02 |
| | | | 705/38 |
| 2006/0069640 A1 | 3/2006 | Fitzgerald et al. | |
| 2006/0235788 A1 | 10/2006 | Guyton | |
| 2009/0048957 A1* | 2/2009 | Celano | G06Q 40/00 |
| | | | 705/35 |
| 2014/0365350 A1* | 12/2014 | Shvarts | G06Q 40/00 |
| | | | 705/35 |
| 2014/0365353 A1* | 12/2014 | Shvarts | G06Q 40/025 |
| | | | 705/38 |
| 2015/0193749 A1* | 7/2015 | Ivanoff | G06Q 50/22 |
| | | | 705/40 |
| 2017/0076379 A1* | 3/2017 | Wadley | G06Q 40/06 |
| 2018/0082372 A1* | 3/2018 | Diana | G06Q 10/0637 |

OTHER PUBLICATIONS

First State, "Financial Calculators," https://www.fsbblm.com/index.cfm/financial-calculators?CALCULATORID=PC10&TEM, © 2018 First State Bank of Bloomington, 2 pages.

Wells Fargo, "Debt Consolidation Calculator," https://www.wellsfargo.com/personal-credit/debt-consolidation-calculator/, © 1999-2018 Wells Fargo, 2 pages.

Firstmark Credit Union, "Use our Free Loan Payment Calculators to see how affordable your next loan can be!," https://www.firstmarkcu.org/calculators/loan-payment-calculator.php?CALCULATORID=, © Copyright 2017 by Firstmark Credit Union, 2 pages.

FinAid, "Loan Consolidation Calculator," http://www.finaid.org/calculators/loanconsolidation.phtml, Copyright © 2018 FinAid Page, LLC., 1 page.

Student Loan Hero, "Student Loan Consolidation vs. Refinancing Calculator," https://studentloanhero.com/calculators/student-loan-consolidation-refinancing-calculator/, © Copyright 2012-2018 Student Loan Hero™, Inc., 6 pages.

Magnify money, "Student Loan Refinance Calculator," https://www.magnifymoney.com/calculator/student-loan-refinance-calculator, Nov. 2, 2018, 4 pages.

* cited by examiner

400

Your Estimated Monthly Payment

402 — $ Include a loan to start

Total Loan Amount     Interest Rate

404 — $0     5.49% — 406

Rate Type

408 — Fixed     Variable — 410

412 — Term (in years)     416

414 — | 5 | 7 | 10 | 15 | 20 |

418 — Why do I have a grayed out option?

420 — OK     Cancel — 422

My loans (2)     Ineligible (1)

| | Your Estimated Monthly Payment | |
|---|---|---|
| 502 — | $256.00 | |

Total Loan Amount 504 — $45,000.56

Interest Rate 5.49% — 506

Rate Type

508 — Fixed    Variable — 510

512 — Term (in years)    416

514 — | 5 | 7 | 10 | 15 | 20 |

518 — Why do I have a grayed out option?

520 — OK    Cancel — 522

My loans (2)    Ineligible (1)

802 — Congratulations on your new Rate and term for your Consolidation loan. You have Chosen the following loans for consolidation:

804 — Private lender 1

Account Number 9920028

806 — US Department of Education

Account Number 67354219

808 — The following loans were not eligible for consolidation, and will continue with their normal payment schedule:

810 — Private lender 2

Account Number 9930068

Monthly Payment  $80.00

828 — Submit

812 — Total Monthly Payment

Old loans    Consolidated Loan

814 — $397.00    $350.00 — 816

818 — Your total payment decreased by $47 per month

820 — Total Cost of Loan

Old loans    Consolidated Loan

822 — $63,000.00    $61,904.98 — 824

826 — Your total cost of loan decreased by $1,095.02

830 — Go Back

FIG. 8

LOAN REFINANCING AND/OR CONSOLIDATION TOOL

BACKGROUND

Individuals borrow money from financial institutions for a variety of purposes, such as purchasing an automobile, purchasing a house, paying for a vacation and paying for an education. Loans may be obtained over a period of time and may have different interest rates, different terms and be of different types.

When individuals carry a plurality of loans, it can sometimes be beneficial to consolidate two or more loans. Consolidation can sometimes permit a total cost of a combined loan to be less than a total cost of individual loans or allow the individual more flexibility when repaying the loans. A single loan can sometimes also be refinanced to obtain more favorable terms.

SUMMARY

Embodiments of the disclosure are directed to a method implemented on a financial electronic computing device for processing requests to consolidate loans. The method comprises: receiving, from one or more third party electronic computing devices, information regarding outstanding loans for a user that are issued by one or more third party lenders; sending, to a user electronic computing device information, regarding the outstanding loans for the user issued by the one or more third party lenders and any outstanding loans for the user issued by a financial institution associated with the financial institution electronic computing device; receiving, from the user electronic computing device, selection of one or more of the outstanding loans for refinancing or two or more of the outstanding loans for consolidation; performing a benefits analysis for the one or more outstanding loans the user wishes to refinance or the two or more outstanding loans the user wishes to consolidate; when one or more loans are to be refinanced, based on the benefits analysis, determining whether an overall cost of a refinanced loan is lower than an overall cost of not refinancing the one or more loans; and when two or more loans are to be consolidated: based on the benefits analysis, determining whether any of the two or more outstanding loans can be consolidated, and whether any of the two or more loans are excluded from being consolidated; sending consolidated loan information to the user electronic computing device regarding a consolidated loan for any of the two or more of the loans that can be consolidated; and sending exclusion information to the user electronic computing device regarding any of the two or more loans that are excluded from being consolidated.

In another aspect, a method implemented on an electronic computing device for permitting two or more student loans of a user to be consolidated comprises: rendering, on a display screen of the electronic computing device, a user interface that provides information regarding student loans for the user; receiving a selection, via the user interface, of two or more of the student loans for consolidation; sending selection information to a server computing device identifying the selection of the two or more student loans for consolidation; receiving, from the server computing device, loan consolidation information, the loan consolidation information: identifying whether the two or more student loans can be consolidated, and providing details regarding a proposed consolidation of the two or more student loans; and displaying, on the user interface, the loan consolidation information.

In yet another aspect, an electronic computing device comprises: a processing unit; and system memory, the system memory including instructions which, when executed by the processing unit, cause the electronic computing device to: receive from one or more third party electronic computing devices, information regarding outstanding loans for a user that are issued by one or more third party lenders; send to a user electronic computing device information regarding outstanding loans for the user issued by the one or more third party lenders and any outstanding loans for the user issued by a financial institution; receive from the user device, selections of two or more of the outstanding loans the user wishes to consolidate; perform a benefits analysis for the selections of the two or more of the outstanding loans the user wishes to consolidate, the benefits analysis calculating a total cost of each of the two or more outstanding loans before and after consolidation and determining whether any benefits for any of the two or more of outstanding loans would be lost as a result of consolidation; based on the benefits analysis, determine whether the total cost of any of the two or more of the outstanding loans would be higher as a result of consolidation; when a determination is made that the total cost of any of the two or more of the outstanding loans would be higher as a result of consolidation, designate each loan for which the total cost would be higher as a result of consolidating as being excluded from being consolidated; send consolidated loan information to the user electronic computing device regarding a consolidated loan for two or more of the outstanding loans that can be consolidated; send exclusion information to the user electronic computing device regarding any of the two or more of the outstanding loans that are excluded from being consolidated; and send information to the user device regarding any benefits that would be lost as a result of consolidation.

The details of one or more techniques are set forth in the accompanying drawings and the description below. Other features, objects, and advantages of these techniques will be apparent from the description, drawings, and claims.

DESCRIPTION OF THE DRAWINGS

FIG. 4 shows another example graphical user interface that can be used with the system of FIG. 1.

FIG. 5 shows yet another example graphical user interface that can be used with the system of FIG. 1.

FIG. 8 shows yet another example graphical user interface that can be used with the system of FIG. 1.

DETAILED DESCRIPTION

Figure 1:
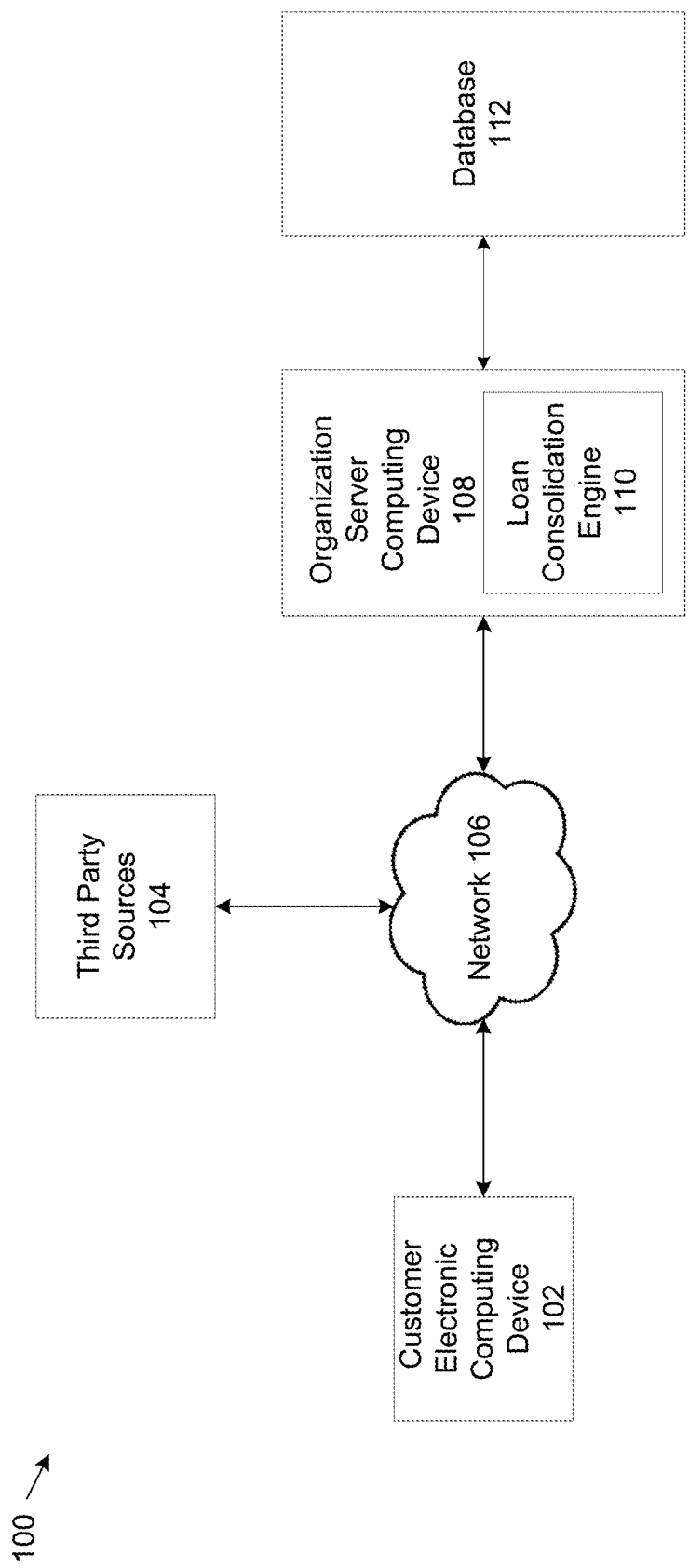
FIG. 1 shows an example refinance and/or loan consolidation system.

The present disclosure is directed to systems and methods that can implement a loan refinancing and/or consolidation tool to refinance and/or consolidate loans. The loan refinancing and/or consolidation tool can permit a borrower to dynamically select one or more loans for refinancing or two or more loans for consolidation and to view details of the refinanced or consolidated loan. The details can specify a total cost, interest rate and term of the refinanced or consolidated loan. The individual can compare the details of the refinanced or consolidated loan with similar details of the selected loans. Based on the comparison, the individual can decide whether to pursue the refinanced or consolidated loan or to experiment and select different terms or types loans, or different loans for refinancing or consolidation.

As noted, the loan refinancing and/or consolidation tool can be used to both refinance and consolidate loans. While the examples provided herein focus mainly on the consolidation of two or more loans, the examples provided herein can also be used to refinance an existing loan.

The loan refinancing and/or consolidation tool can display and permit consolidation of two or more loans of a same type. For example, the loan refinancing and/or consolidation tool can permit consolidation of two or more personal loans into a consolidated personal loan. As another example, the loan refinancing and/or consolidation tool can permit consolidation of two or more student loans into a consolidated student loan. While the examples described herein are in reference to consolidation of student loans, consolidation of other loan types is possible, such as personal loans, car loans, home equity loans and mortgages.

Student loans can be obtained from a variety of sources, including the United States Department of Education. Student loans can also be obtained from financial institutions or other private lenders, such as banks like Wells Fargo Bank, N.A. of San Francisco, Calif. Federal student loans often come with benefits that privately-funded student loans do not have. Example benefits can include a lower interest rate, a fixed interest rate, and an income-driven repayment plan. Some federal loans also include loan forgiveness, as part of a loan forgiveness program, if the loan holder performs certain actions, such as by working in certain public service jobs and loan payments are made for a certain number of years. Privately funded student loans typically do not include these benefits.

When federal student loans and privately funded student loans are combined, the loan holder can sometimes lose the benefits associated with certain of the consolidated loans, such as the federal student loans. The loan refinancing and/or consolidation tool can provide a warning to an individual when a proposed consolidation of a federal student loan with a privately funded student loan results in a loss of benefits from the federal student loan. In addition, for cases where a consolidation of a federal student loan with a privately funded student loan results in an overall increase in loan costs to the individual, the loan refinancing and/or consolidation tool can prevent the individual from consolidating these loans.

The loan refinancing and/or consolidation tool includes a user interface that permits the individual to view his/her current student loans. These current student loans can originate from a plurality of sources, including the Department of Education, financial institutions, and other sources. As discussed in more detail later herein, using the user interface, the individual can view loans that are eligible for consolidation, can select loans to be consolidated, can select a fixed or variable rate type for the consolidated loan, and can select a term in years for the consolidated loan. After selections are made, the user interface can display an estimated monthly payment, an interest rate, and a total cost for the consolidated loan. The individual can decide whether to accept the consolidated loan, decline the consolidated loan, or experiment by selecting different loans for consolidation and viewing details of resulting new consolidated loans.

The systems and methods discussed herein are directed to a computing technology that can consolidate two or more student loans. Information regarding the loans can be obtained from multiple sources, including a financial institution at which the two or more student loans are consolidated and one or more third party sources. The third party sources can correspond to third party financial institutions, for example private banks or the US Department of Education, that can provide student loans.

Information received at the financial institution regarding student loans issued to the student can be processed at the financial institution and a determination can be made whether the loans can be consolidated. The determination can be based on a benefits analysis that can determine whether an overall cost for the consolidated loan would be less than overall costs of the non-consolidated student loans. A summary of benefits derived from consolidation of the student loans can be sent to a customer electronic computing device for display to the student.

Thus, the systems and methods can obtain student loan information from multiple diverse sources, perform a benefits analysis for consolidating two or more of the student loans, and efficiently present a summary of the benefits analysis to the student on a user interface of the student's electronic computing device.

FIG. 1 shows an example system 100 that can support consolidation of student loans. The example system 100 includes a customer electronic computing device 102, third party sources 104, a network 106, an organization server computing device 108, and a database 112. The organization server computing device 108 includes a loan consolidation engine 110. More, fewer, or different components are possible.

The example customer electronic computing device 102 is an electronic computing device of a customer of a financial institution that can provide a loan refinancing and/or consolidation tool. The electronic computing device can be one or more of a desktop computer, a laptop computer, or a mobile computing device, such as a tablet computer or a smartphone. Other electronic computing devices are possible.

The example third party sources 104 are electronic computing devices, typically server computing devices, of third party sources that can provide information regarding student loans that the customer may have obtained from one or more of the third party sources 104. Examples of third party sources 104 can include the U.S. Department of Education and third party financial institutions. Other third party sources 104 are possible.

The example network 106 is a computer network and can be any type of wireless network, wired network and cellular network, including the Internet. Customer electronic computing device 102 and third party sources 104 can communicate with organization server computing device 108 using network 106.

The example organization server computing device 108 is a server computing device of a financial institution, such as a bank, that can provide the loan refinancing and/or consolidation tool to the customer. In some implementations, the loan refinancing and/or consolidation tool can be a software application that can be installed on customer electronic computing device 102. In other implementations, the loan refinancing and/or consolidation tool can be operational on a website of organization server computing device 108, and the customer can access the website via web browser software operational on customer electronic computing device 102. The customer can have one or more financial accounts, including student loans, from the financial institution.

The example loan consolidation engine 110 identifies existing student loans for the customer, displays details regarding the existing student loans on customer electronic computing device 102, receives selections from the customer regarding consolidating two or more of the existing student loans, calculates costs for the consolidated loans, and displays the costs and other features of the consolidated loans on customer electronic computing device 102. The loan consolidation engine 110 is described in more detail later herein.

The example database 112 is a database associated with the organization of organization server computing device 108. Database 112 can store personal and financial information for the customer and for family members of the customer. Database 112 can also store student loan information for the customer for customer student loans that are originated at the financial institution. Database 112 can be distributed over a plurality of databases. Organization server computing device 108 can be programmed to query (e.g. using Structured Query Language, SQL) database 112 to obtain the student loan information.

An example schema including, but not limited to, customer student loan information stored in database 112 is shown below. More, fewer, or different fields are possible.

Customer Name—the name of the customer;

Customer ID at financial institution—a set of letters, numbers, or other symbol that uniquely identifies the customer at a financial institution at which the customer has at least one financial account;

Family member data—a pointer to an area of memory providing names, ages, employers and financial account information for the customer and for family members of the customer;

Original loan 1 data—a pointer to an area of memory providing information regarding a first student loan for the customer provided by the financial institution, including:

First loan identifier—a set of letters, numbers, or other symbol that uniquely identifies the first student loan for the customer at a financial institution;

Amount of first loan—a dollar amount of the first student loan;

Date of first loan—a date at which the first loan was obtained;

Interest rate of first loan—an APR interest rate for the first student loan;

Type—a text field indicating a type of the first loan, either fixed or variable

Term—a number indicating a length in month of the first loan

Total cost of first loan—a dollar amount including principal and interest for the first loan Monthly payment—a current monthly payment for the first loan Original loan n data—a pointer to an area of memory providing information regarding an nth student loan for the customer provided by the financial institution, including the same fields as above.

Consolidated loan 1 data—a pointer to an area of memory providing information regarding a first consolidated student loan for the customer provided by the financial institution, including:

First consolidated loan identifier—a set of letters, numbers, or other symbol that uniquely identifies the first consolidated loan for the customer at a financial institution;

Amount of first consolidated loan—a dollar amount of the first consolidated loan;

Individual loans—a pointer to a list of identifiers of all individual loans that comprise the first consolidated loan;

Date of first consolidated loan—a date at which the first consolidated loan was obtained;

Interest rate of first consolidated loan—an APR interest rate for the first consolidated loan;

Type—a text field indicating a type of the consolidated loan, either fixed or variable Term—a number indicating a length in month of the consolidated loan Total cost of consolidated loan—a dollar amount including principal and interest for the consolidated loan Monthly payment—a current monthly payment for the consolidated loan Consolidated loan n data—a pointer to an area of memory providing information regarding an nth consolidated loan for the customer provided by the financial institution, including the same fields as above.

The above schema permits the database to be queried for data regarding original and consolidated student loans for the customer.

As an example, the following messaging format can be used between the organization server computing device 108 and the database 112 to obtain the current monthly payment amount for a first original student loan for the customer.

| Customer ID | First original loan identifier | Monthly Payment |
|---|---|---|

As an example, the database 112 can use the following messaging format in responding to such a request. In this example, a dollar amount for the current monthly payment is returned in response to the request.

| Customer ID | Dollar amount of current monthly payment for the first original student loan |
|---|---|

As another example, the following messaging format can be used between the organization server computing device 108 and the database 112 to obtain the current monthly amount for a first consolidated loan that consolidates the first student loan with one or more other student loans.

| Customer ID | First consolidated loan identifier | Monthly Payment |
|---|---|---|

Figure 2:
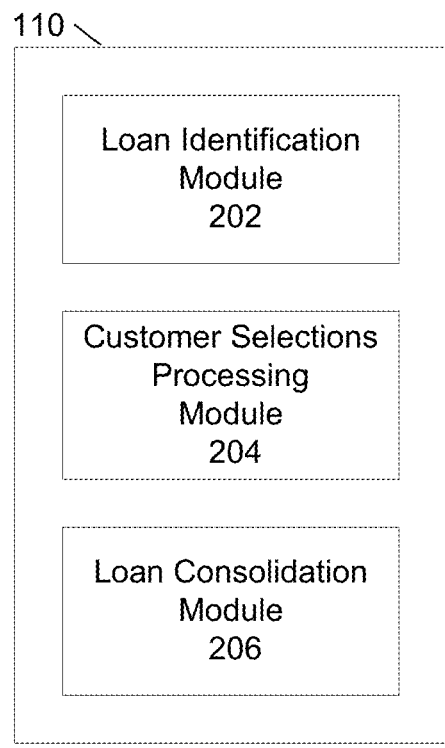
FIG. 2 shows example modules of an example loan consolidation engine of an organization server computing device of FIG. 1.

FIG. 2 shows example modules of loan consolidation engine 110. The modules include a loan identification module 202, a customer selections processing module 204, and a loan consolidation module 206. More, fewer, or different modules are possible.

The example loan identification module 202 identifies student loans currently held by the customer. When the loans have been originated by the financial institution, the financial institution has access to details regarding the loans. However, when the loans have been originated by third parties, the financial institution may be able to obtain information regarding the loans from third party sources 104. For example, when the financial institution knows about the loans originating from the third party sources, the financial institution can sometimes communicate with the third party sources 304 and obtain information regarding the loans originating from the third party sources. Alternatively, the customer may be able to manually provide information regarding these loans to the loan identification module 202.

The example customer selections processing module 204 processes selections of student loans to be consolidated. The selections can identify two or more loans that the customer proposes to consolidate, and selected characteristics of the consolidated loan, including a type of the consolidated loan and a term of the consolidated loan. The selections can made by the customer via a user interface of customer electronic computing device 102. The selections can identify the loans proposed to be consolidated and can also indicate proposed characteristics of the proposed consolidated loan, including a proposed type of the consolidated loan and a term of the proposed consolidated loan.

The processing can comprise receiving the selections, accessing the loan consolidation module 206, receiving a result of the processing from the loan consolidation module 206, and sending the results of the processing to customer electronic computing device 102. The results of the processing can then be rendered on a user interface of the software application for the loan refinancing and/or consolidation tool running on customer electronic computing device 102.

The example loan consolidation module 206 receives from customer selections processing module 204 the customer selections of loans to be consolidated. Loan consolidation module 206 determines whether the loans can be consolidated, and when a determination is made that the loans can be consolidated, loan consolidation module 206 calculates an estimated monthly cost for the consolidated loan, an interest rate for the consolidated loan, and a total cost to the customer for the consolidated loan. The loan consolidation module 206 can also determine whether any of the proposed loans for consolidation should be excluded from consolidation. As discussed later herein, loans can be excluded for consolidation when a cost for the consolidated loan is more than a sum of costs for individual loans to be consolidated. Loans that are excluded from consolidation can be included in an exclusion group of loans.

Figure 3:
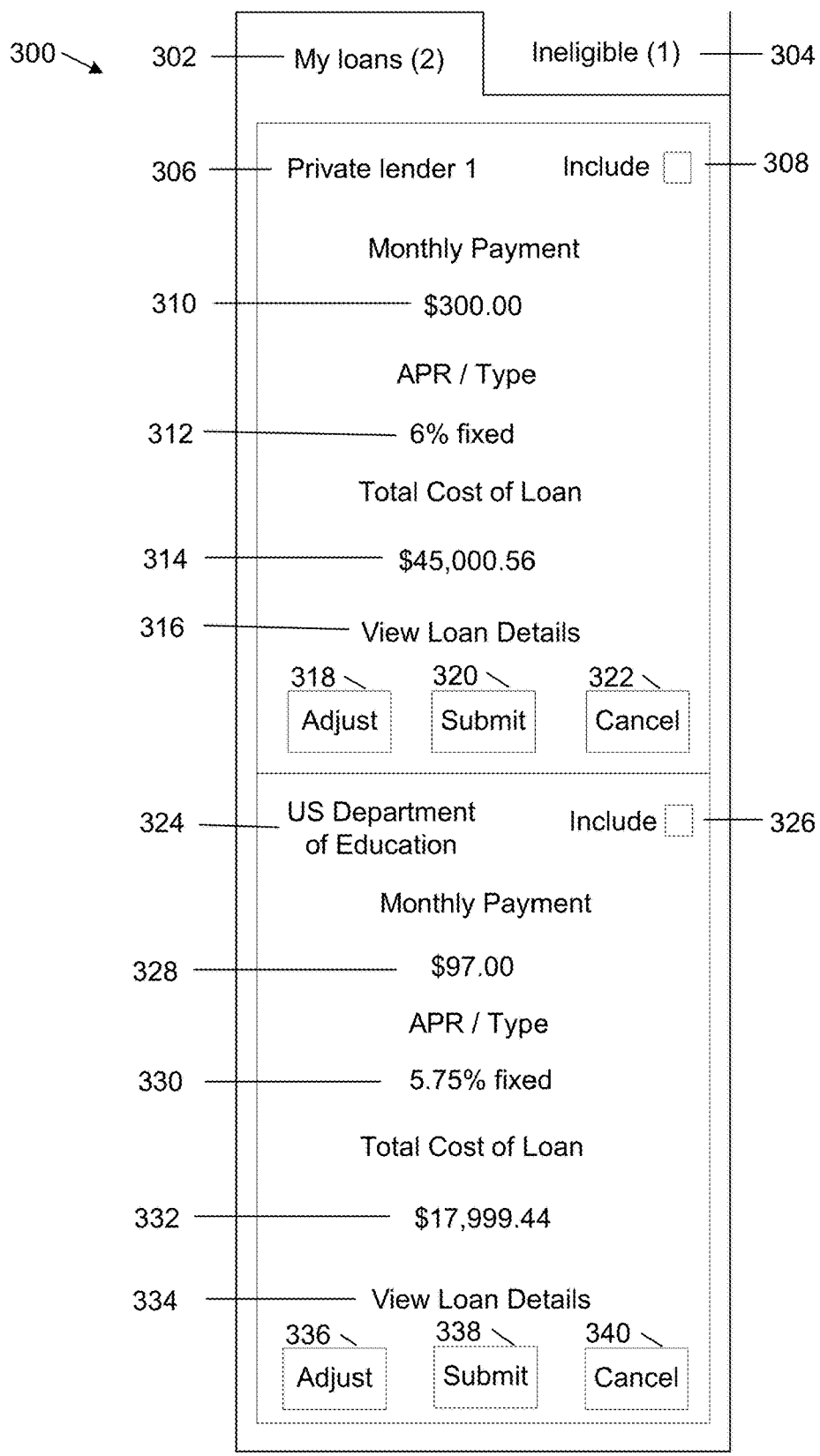
FIG. 3 shows an example graphical user interface that can be used with the system of FIG. 1.

FIG. 3 shows an example user interface 300 that can be used to consolidate two or more loans. Alternatively, user interface 300 can be used to refinance one or more loans. User interface 300 can be rendered on customer electronic computing device 102 when a customer of a financial institution activates a software application for consolidating or refinancing loans. User interface 300 can be rendered, when customer electronic computing device 102 is a smartphone, by activating the software application on the smartphone. User interface 300 can also be rendered, when customer electronic computing device 102 is a desktop or laptop computer, by accessing a website of the financial institution via the desktop or laptop computer and activating the software application on the website.

In some embodiments, user interface 300 is optional. In these embodiments, user interface 600, shown in FIG. 6, can be used in lieu of user interface 300. User interface 300 and the other user interfaces described in this disclosure are example user interfaces only. More, fewer, or different control components can be used in each of these user interfaces.

Example user interface 300 includes two tabs, 302 and 304, that provide summary information for loans currently held by the customer. Tab 302 shows summary information for loans that are eligible for consolidation, and tab 304 shows summary information for loans that are ineligible for consolidation. As mentioned earlier herein, and as will be discussed in further detail later herein, loans can be ineligible for consolation when the resulting consolidated loan would be more expensive than a non-consolidated loan.

User interface 300 shows that the customer has two active loans, from private investor 306 and the US Department of Education 324—that are eligible for consolidation. The loan from private investor 306 has a current monthly payment 310 of $300.00, an APR/Type 312 of 6%, fixed interest, and a total cost 314 of $45,000.56. The loan from US Department of Education 324 has a monthly payment 328 of $97.00, an APR/Type 330 of 5.75%, fixed interest, and a total cost 334 of $17,994.44.

User interface 300 also includes links 316 and 332, by which the customer can view more details of the loans from private investor 306 and US Department of Education 324, respectively. The detailed information, including such items as account number, account name and estimated remaining term of the loans, can be obtained by the customer clicking on the respective links.

User interface 300 includes checkboxes 308 and 326 that permit the customer to include the loans from private investor 306 and US Department of Education 324, respectively for consolidation. A loan can be included for consolidation by checking its associated checkbox.

User interface 300 also includes controls that can be used for adjusting parameters of the loans to be consolidated, and thereby viewing different outcomes of loan consolidation before finalizing the loan consolidation. Example control buttons are provided for adjust 318, submit 320, and cancel 322 for the loan from private investor 306 and for adjust 336, submit 338, and cancel 340 for the loan from US Department of Education 324. Details for a process of adjusting parameters of the loans in described next, herein.

FIG. 4 shows an example user interface 400 that can be used to adjust parameters of a loan. User interface 400 can be activated on the display screen of customer electronic computing device 102 by selecting Adjust 318 for the loan from private investor 306 and by selecting Adjust 336 for the loan from US Department of Education 324.

User interface 400 includes fields for a starting dollar amount 402 for a loan, a total loan amount 404, and interest rate 406. Also included are controls for a fixed rate type 408, a variable rate type 410 and a term 412 of a loan in years. As shown, in FIG. 4, the example user interface 400 includes possible terms of 5, 7, 10, 15 and 20 years. Other terms are possible. A term can be selected by clicking on a box associated with the term. When the term is selected, the box for the selected term changes color, for example to black, or is otherwise highlighted.

The interest rate 406 corresponds to a current available interest rate for the consolidated loan based on the rate type and the term that are selected. As shown in FIG. 4, for a selection of a fixed-interest consolidated loan and a 15-year term, an example available interest rate 406 for the consolidated loan is 5.49%.

FIG. 4 shows that a 15-year term is selected, indicated by a solid-color control 416, and that a control 414 for a 5-year term is grayed out. A grayed out control for a term indicates that the term cannot be selected. The control generally cannot be selected because selecting the term would result in an unacceptable debt service for the consolidated loan. A link 418 is also included to provide an explanation of why the term cannot be selected. The customer can display the explanation be clicking on link 418. User interface 400 also includes an OK control 420 to accept the selections made and a cancel control 422 to cancel any selections and return to user interface 300.

FIG. 4 shows user interface 400 when the customer selects either Adjust 318 or Adjust 336 without selecting a loan for consolidation—i.e. without checking either checkbox 308 or 326. For this scenario, the initial dollar amount 402 for the loan and the total loan amount 404 are both zero. However, when the customer selects a loan for consolidation, by checking either checkbox 308 or checkbox 326, the current cost of the loan, corresponding to the checkbox that is checked, is automatically entered into total loan amount 404 field.

FIG. 5 shows an example user interface 500 that depicts parameters for a consolidation of the loan from private investor 306 when a fixed rate type and a 15-year term is selected. User interface 500 shows an effect of consolidation for only the loan from private investor 306, without considering any other loans for consolidation. As shown in FIG. 5, consolidating the loan from private investor 306 for a fixed interest 15-year loan results in an example estimated monthly payment 502 of $256.00. Alternatively, the user can choose to refinance the loan from private investor 306 instead of consolidating with one or more other loans. When the user chooses to refinance without consolidating, the loan from private investor 306 can be refinanced to a fixed interest 15-year loan with a new estimated monthly payment of $256.00.

The estimated monthly payment 502 of $256 represents an effect of refinancing the loan from private investor 306 based on the fixed interest rate type, the 15-year term for the loan, and the current 5.49% interest rate available for the 15-year fixed interest loan. Using different parameters, for example a variable interest rate type or a different term, would likely result in a different interest rate for the consolidated loan and a different estimated payment. The customer can experiment with different parameters to obtain real-time estimates of an interest rate and monthly payment for refinancing the loan from private investor 306 and part of consolidation with another loan.

Loan consolidation module 206 can calculate the updated interest rate and monthly payment and updated total cost of the loan. When calculating these values, loan consolidation module 206 can obtain a number of years remaining on the loan from private investor 306 and the total dollar value of the loan from private investor 306 that remains to be paid. The updated interest rate, monthly payment, and updated total cost of the loan can then be calculated using the current interest rate available for the type of loan.

As discussed, two or more loans can be consolidated. Once the parameters for refinancing the loan from private investor 306 are selected, the include checkbox 326 can be checked to include the loan from US Department of Education 324 in the loan consolidation. However, because there is only one consolidated loan, the parameters for type of loan and term of loan need to be the same for the consolidated loan and for any additional loans that are to be included for consolidation. The parameters are the same even when individual loans have different loan terms. Thus, for the example from FIG. 5, when the loan from US Department of Education 324 is added to the loan from private investor 306 for consolidation, the fixed interest rate type, term of 15 years and interest rate of 5.39% are also applied to the loan from US Department of Education 324.

In general, any loan can be considered first for consolidation and refinancing. However, all accepted parameters for rate type, term and interest rate for the first loan to be consolidated are applied to any additional loans to be consolidated with the first loan.

Figure 6:
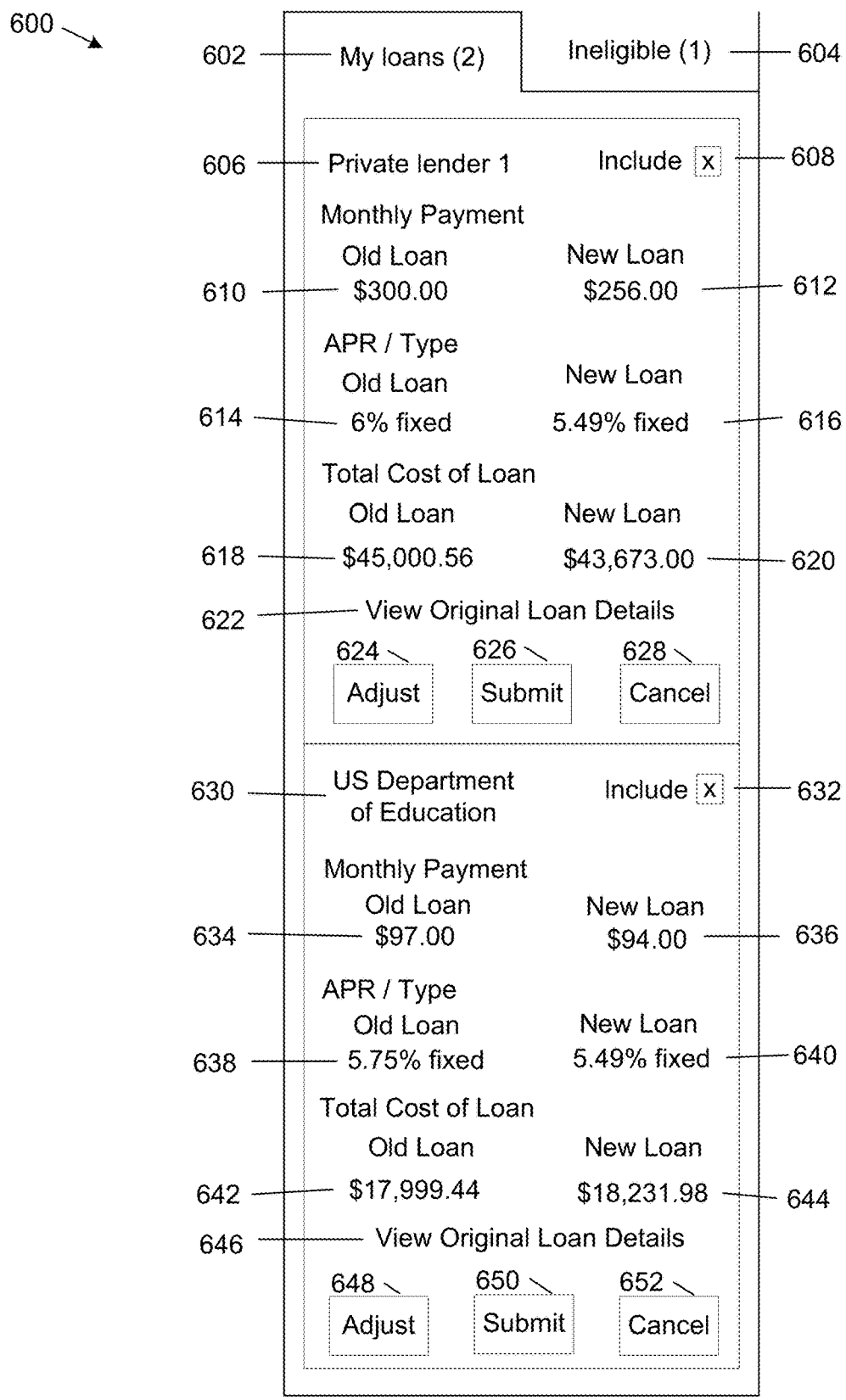
FIG. 6 shows yet another example graphical user interface that can be used with the system of FIG. 1.

FIG. 6 shows an example user interface 600 that provides summary information for a new consolidated loan that includes the loan from private investor 306 and the loan from US Department of Education 324. User interface 600 can be rendered when OK button 520 is selected from user interface 500 and when both include checkbox 608 and include checkbox 632 are checked on user interface 600. In some embodiments, user interface 600 and can be combined with user interface 400 and user interface 500 in a single user interface.

In addition to include checkboxes 608 and 632, user interface 600 includes a tab 602 for the current active loans eligible for consolidation by the customer, a tab 604 for current ineligible loans, and summary information for a consolidated loan of the loans from private investor 606 and from US Department of Education 630.

The summary information for the updated loan from private investor 606 includes an example monthly payment, interest rate, type and total cost for both the old (non-consolidated) loan from private investor 606 and the new (consolidated) loan. The interest rate is indicated by APR (annual percentage rate). As shown in FIG. 6, the example old loan monthly payment 610 is $300.00 per month, the old loan APR/type 614 is 6% interest for a fixed loan, and the old loan total cost 618 is $45,000.56. The example new (consolidated) loan monthly payment 612 is $256.00, the new loan APR/type 616 is 5.49% for a fixed loan, and the new loan total cost is $43,673.00. The term of the new loan (not shown in FIG. 6) is the same term as selected via user interface 500 for the consolidated loan, in this example 15 years.

An example link for View Original Loan Details 622 permits a display of detailed information regarding the old loan from private investor 606, including an account number, account name, estimated remaining term, and other details. The original loan details can be displayed by clicking the View Original Loan Details 622 link.

Example buttons are also included for adjust 624, submit 626 and cancel 628. When the adjust 624 button is selected, a user interface screen similar to user interface 500 can be displayed. This user interface screen can permit the customer to make further adjustments to the consolidated loan. When the submit 626 button is selected, the summary information for the updated loan from private investor 606 is submitted to organization server computing device 108. When the cancel 628 button is selected, the selections shown on user interface 600 for the loan from private investor 606 are canceled.

User interface 600 also includes an include 608 checkbox for the loan from private investor 606. The include 608 checkbox is checked when the customer determines that the updated loan from private investor 606 is to be included as part of the consolidated loan.

The summary information for the updated loan from US Department of Education 630 also includes an example monthly payment, interest rate, type and total cost for both the old (non-consolidated) loan from US Department of Education 630 and the new (consolidated) loan. However, as stated earlier herein, because parameters for the private investor 606 were selected first, the summary information for the updated loan from US Department of Education 630 includes the same term, interest rate, and type of loan as the loan from private investor 606. As a result, the parameters for the consolidated loan that includes the loan from US Department of Education 630 are adjusted to match the term, interest rate and type of loan from private investor 606.

As shown in FIG. 6, the example old loan monthly payment 634 is $97.00 per month, the old loan APR/type 638 is 5.75% interest for a fixed interest rate loan, and the old loan total cost 642 is $17,999.44. The example new (consolidated) loan monthly payment 636 is $94.00, the new loan APR/type 640 is 5.49% for a fixed interest rate loan, and the new loan total cost 644 is $18,231.98. The term of the consolidated loan (not shown in FIG. 6) is 15 years.

Summary information for the loan from US Department of Education 630 includes an example View Original Loan Details 646 link, and example adjust 648, submit 650, and cancel 652 buttons. In an example implementation, when parameters for the updated loan from private investor 606 are selected first, the adjust 648, submit 650, and cancel 652 buttons can be grayed out (disabled). Similarly, when the loan from US Department of Education 630 is selected first for consolidation, the adjust 624, submit 626, and cancel 628 buttons can be grayed out (disabled).

User interface 600 also includes an include 632 checkbox for the loan from US Department of Education 630. The include 608 checkbox is checked when the user determines that the updated loan from US Department of Education 630 is to be included as part of the consolidated loan.

Figure 7:
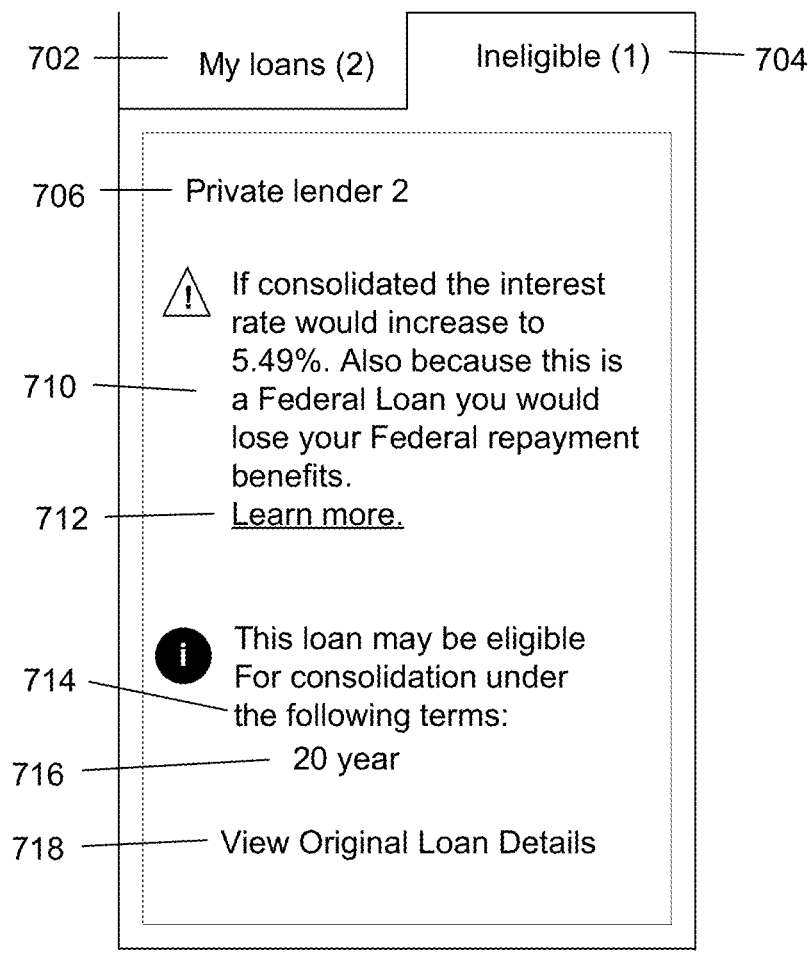
FIG. 7 shows yet another example graphical user interface that can be used with the system of FIG. 1.

FIG. 7 shows an example user interface 700 that provides information for loans that are determined to be ineligible for consolidation. User interface 700 can be activated when the customer selects 604 tab from user interface 600. When selected, summary information for the ineligible tab 704 of user interface 700 is displayed and summary information for the my loans 702 tab (for loans eligible for consolidation, per user interface 600) is not displayed.

For the example of FIG. 7, only one loan, private investor 706, is ineligible for consolidation. User interface 700 includes example information text 710 that explains why the loan from private investor 706 is ineligible for consolidation. In this example, the loan from private investor 706 is ineligible for consolidation because at the consolidation interest rate of 5.49%, the cost to the customer of a consolidated loan that includes the loan from private investor 706 would be more than the cost to the customer if the loan from private investor 706 was not consolidated. In addition, the example information text 710 explains that Federal repayment benefits would be lost for the loan from private investor 706 if this loan were to be consolidated. A link 712 is included to provide more information about reasons why the loan from private investor 706 is ineligible for consolidation.

User interface 700 also includes another example information text 714 that explains that the loan from private investor 706 may be eligible for consolidation for a shorter term consolidation loan. The current example consolidation loan is for 15 years. For a shorter term, the interest rate cost for consolidating the loan from private investor 706 could be lower because the term of the consolidated loan would be less than 15 years.

A view original loan details link 718 permits a display of details of the loan from private investor 706. The details can include such items and as monthly cost, interest rate, loan type, total cost of loan, account number, account name, estimated remaining term, and other details.

FIG. 8 shows an example user interface 800 for the consolidated loan. The summary screen shows an example congratulations message 802, a listing, including name and account number, of the loans that were consolidated, an example message 808 regarding loans not eligible for consolidation, a summary 812 of the total monthly payments for the old loans 814 and consolidated loan 816, a statement 818 indicating a reduction in the total monthly payment, a summary 820 of the total cost for the old loans 822 and the consolidated loan 824, and a statement 826 indicating a reduction in the total cost of the loans. As shown in FIG. 8, the loans eligible for consolidation include the loan from private investor 804 and the loan from the US Department of Education 806. The loan ineligible for consolidation includes the loan for private investor 810. The statement 818 indicates that the total payment has decreased by $47 per month for the consolidated loan, based on a reduction of the old loans cost of $397.00 to the consolidated loan cost of $350.00. The statement 826 indicates that the total cost of the loan has decreased by $1,095.02, based on a reduction of the total cost of the old loans of $63,000 to the total cost of the consolidated loan of $61,904.98.

User interface 800 also includes a submit 828 button and an example go back button 830. The customer can select the submit 820 button to accept the consolidated loan. The customer can select the go back button 822 to go back to a previous user interface, for example user interface 600 or user interface 700.

Figure 9:
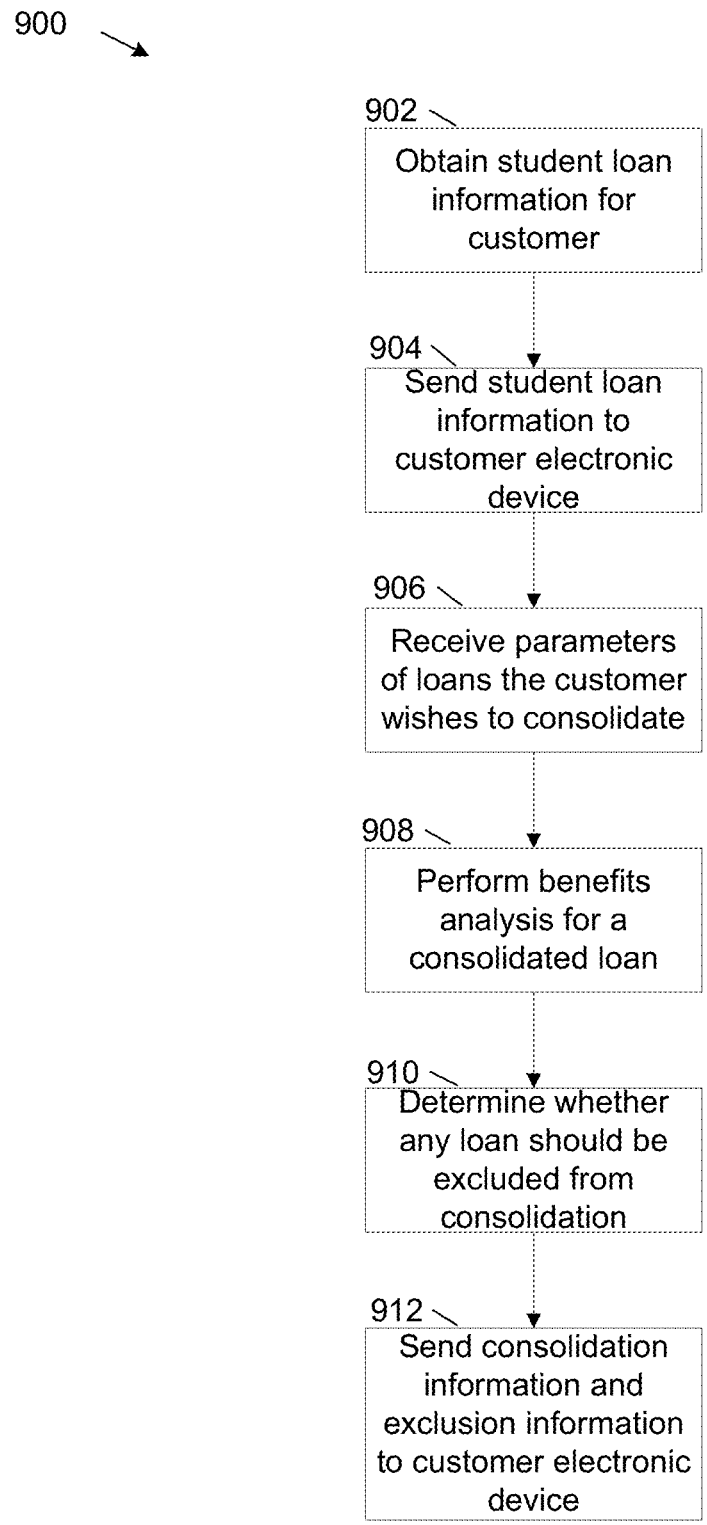
FIG. 9 shows an example method for consolidating student loans.

FIG. 9 shows a flowchart for an example method 900 for consolidating a student loan at a server computing device for a customer of a financial institution. For method 900, the server computing device is organization server computing device 108.

At operation 902, student loan information is obtained for the customer. When the customer has student loans from other sources than the financial institution, organization server computing device 108 can obtain, when possible, information regarding the student loans from third party sources 104, as discussed earlier herein. Any student loan information that cannot be obtained by organization server computing device 108 or third party sources 104 can be manually provided by the customer.

At operation 904, the obtained student loan information for the customer is sent to customer electronic computing device 102 for display on a display screen of customer electronic computing device 102.

At operation 906, organization server computing device 108 receives parameters for loans that the customer would like to consolidate. The parameters are received from customer electronic computing device 102 as a result of customer selections. The parameters can include a type of loan and a term of the loan. Other parameters are possible.

At operation 908, loan consolidation engine 110 performs a benefits analysis for a consolidated loan based on the loan to be consolidated. The benefits analysis determines what the monthly and total cost of the consolidated loan would be, based on a current interest rate available for the consolidated loan and based on the type of loan (fixed or variable) and the term selected for the consolidated loan. The benefits analysis can also determine whether it would be beneficial for the customer to consolidate the loan, based on the monthly and total cost of the consolidated loan.

At operation 910, a determination is made as to whether any loan should be excluded from consolidation. The determination is made based on whether the cost to the customer for the consolidated loan is more than a cost to the customer for the unconsolidated loan. When the cost to the customer for the consolidated loan is more than the cost to the customer for the unconsolidated loan, the loan can be excluded from consolidation.

At operation 912, consolidation information and exclusion information for the consolidated loan is sent to customer electronic computing device 102. This information can then be displayed on a display screen of customer electronic computing device 102.

Figure 10:
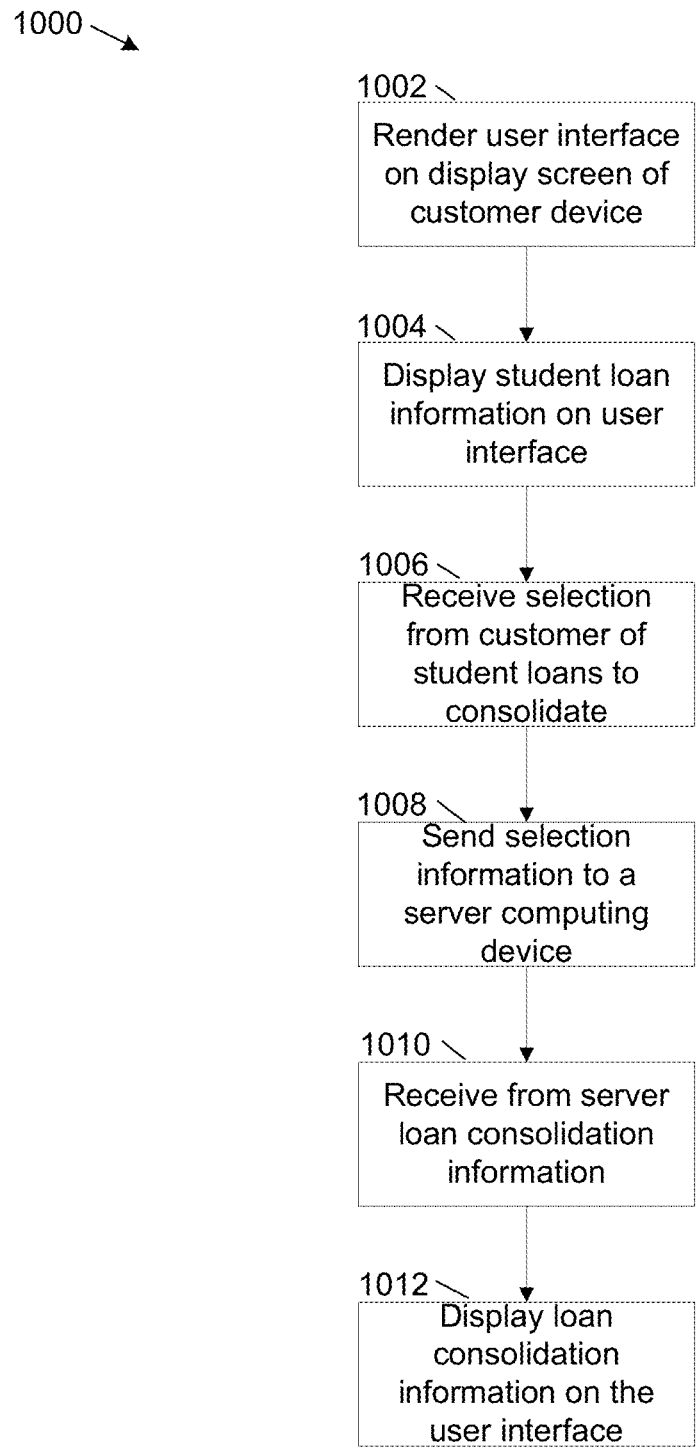
FIG. 10 shows another example method for consolidating student loans.

FIG. 10 shows a flowchart for an example method 1000 for consolidating a student loan at a customer electronic computing device for a customer of a financial institution. For method 1000, the customer electronic computing device is customer electronic computing device 102.

At operation 1002, a user interface for a student loan software application is rendered on a display screen of customer electronic computing device 102. The user interface can be rendered as a result of the customer activating the student loan software application on the display screen of customer electronic computing device 102 or as a result of the customer logging in to a financial account for the customer at organization server computing device 108 and viewing the user interface via a web browser on customer electronic computing device 102.

At operation 1004, student loan information for the customer is displayed on the user interface. The student loan information can comprise currently active student loans issued by the financial institution and currently active student loans from third party sources, such as the U.S. Department of Education.

At operation 1006, a selection is received from the customer of two or more student loans to consolidate. In an example implementation, the student can select a first loan to consolidate and select parameters such as type of loan and term for the first loan at a current available interest rate. The customer can then view outcomes such as a monthly interest rate and total cost of refinancing the first loan as a result of consolidating the first loan. The customer can then either submit the parameters or experiment with new parameters. When the customer accepts the parameters, the customer can then select one or more additional loans to consolidate. The term, and type of loan for the one or more additional loans to consolidate are the same as for the first loan.

At operation 1008, selection information for the loans to be consolidated are sent to organization server computing device 108. The selection information can include the loans to be consolidated and can include the selected parameters of the loans.

At operation 1010, loan consolidation information is received from organization server computing device 108. The loan consolidation information can include an interest rate, total monthly payment amount and total cost of the consolidated loan. The loan consolidation information can also include revised monthly payment amounts and total costs for each of the loans to be consolidated.

At operation 1012, the loan consolidation information is displayed on the user interface of organization server computing device 108.

Figure 11:
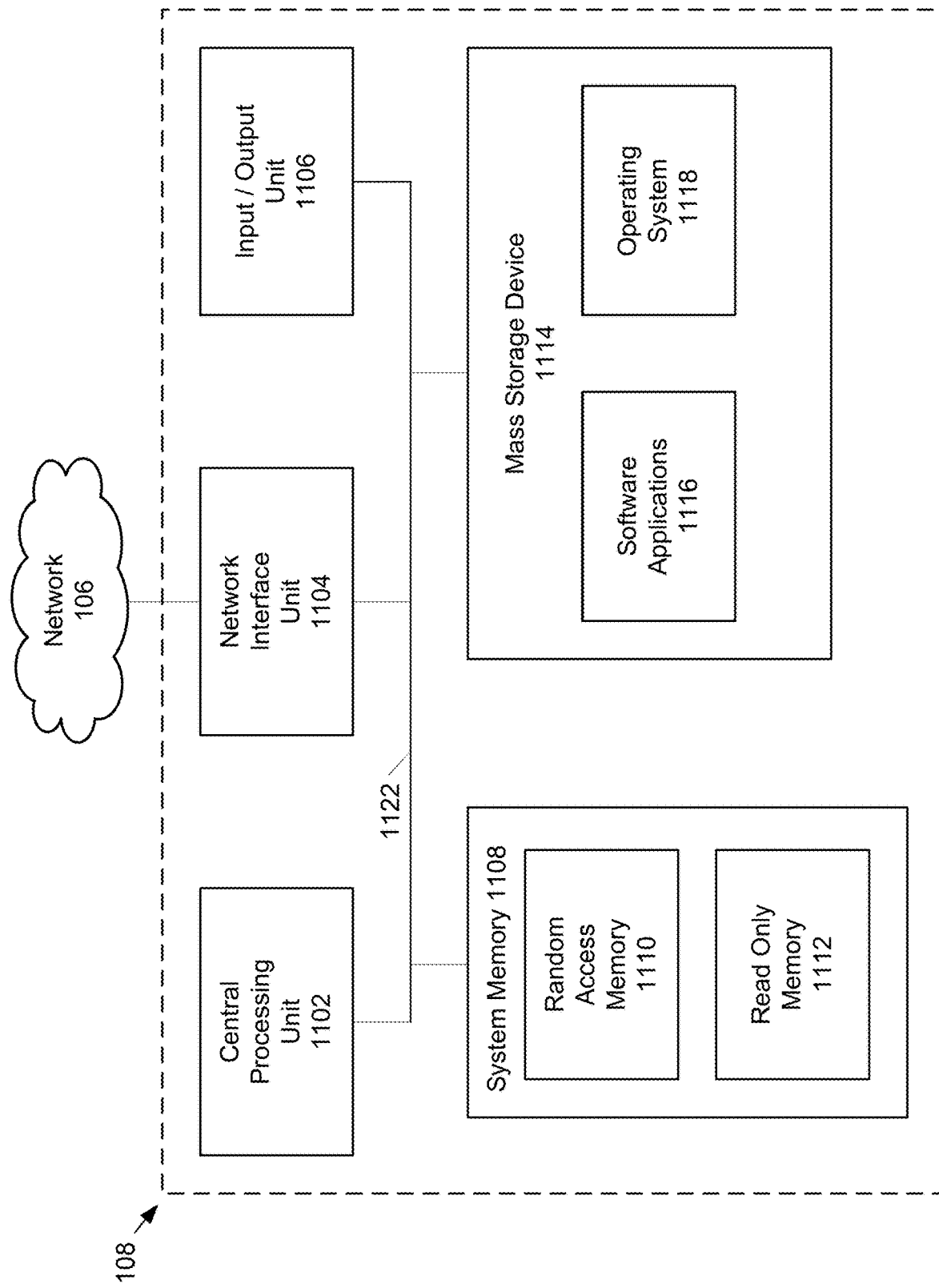
FIG. 11 shows example physical components of the organization server computing device of the system of FIG. 1.

As illustrated in the example of FIG. 11, organization server computing device 108 includes at least one central processing unit ("CPU") 1102, also referred to as a processor, a system memory 1108, and a system bus 1122 that couples the system memory 1108 to the CPU 1102. The system memory 1108 includes a random access memory ("RAM") 1110 and a read-only memory ("ROM") 1112. A basic input/output system that contains the basic routines that help to transfer information between elements within the organization server computing device 108, such as during startup, is stored in the ROM 1112. The organization server computing device 108 further includes a mass storage device 1114. The mass storage device 1114 is able to store software instructions and data. Some or all of the components of the organization server computing device 108 can also be included in customer electronic computing device 102 and/or one or more computing devices associated with third party sources 104.

The mass storage device 1114 is connected to the CPU 1102 through a mass storage controller (not shown) connected to the system bus 1122. The mass storage device 1114 and its associated computer-readable data storage media provide non-volatile, non-transitory storage for the organization server computing device 108. Although the description of computer-readable data storage media contained herein refers to a mass storage device, such as a hard disk or solid state disk, it should be appreciated by those skilled in the art that computer-readable data storage media can be any available non-transitory, physical device or article of manufacture from which the central display station can read data and/or instructions.

Computer-readable data storage media include volatile and non-volatile, removable and non-removable media implemented in any method or technology for storage of information such as computer-readable software instructions, data structures, program modules or other data. Example types of computer-readable data storage media include, but are not limited to, random access memory ("RAM"), read-only memory ("ROM"), erasable programmable read-only memory ("EPROM"), electrically erasable programmable read-only memory ("EEPROM"), flash memory or other solid state memory technology, compact disc read-only memories ("CD-ROMs"), digital versatile discs ("DVDs"), other optical storage media, magnetic cassettes, magnetic tape, magnetic disk storage or other magnetic storage devices, or any other medium which can be used to store the desired information and which can be accessed by the organization server computing device 108.

According to various embodiments of the invention, the organization server computing device 108 may operate in a networked environment using logical connections to remote network devices through the network 106, such as a wireless network, the Internet, or another type of network. The organization server computing device 108 may connect to the network 106 through a network interface unit 1104 connected to the system bus 1122. It should be appreciated that the network interface unit 1104 may also be utilized to connect to other types of networks and remote computing systems. The organization server computing device 108 also includes an input/output controller 1106 for receiving and processing input from a number of other devices, including a touch user interface display screen, or another type of input device. Similarly, the input/output controller 1106 may provide output to a touch user interface display screen or other type of output device.

As mentioned briefly above, the mass storage device 1114 and the RAM 1110 of the organization server computing device 108 can store software instructions and data. The software instructions include an operating system 1118 suitable for controlling the operation of the organization server computing device 108. The mass storage device 1114 and/or the RAM 1110 also store software instructions and software applications 1116, that when executed by the CPU 1102, cause the organization server computing device 108 to provide the functionality of the organization server computing device 108 discussed in this document. For example, the mass storage device 1114 and/or the RAM 1110 can store software instructions that, when executed by the CPU 1102, cause the organization server computing device 108 to display received data on the display screen of the organization server computing device 108.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A method implemented on a financial institution electronic computing device for processing requests to refinance or consolidate loans, the method comprising:
   receiving, via a structured query language (SQL) query, from one or more third party electronic computing devices, information regarding outstanding loans for a user that are issued by one or more third party lenders;
   sending, to a user electronic computing device, the information regarding the outstanding loans for the user issued by the one or more third party lenders and the outstanding loans for the user issued by a financial institution associated with the financial institution electronic computing device;
   receiving, from the user electronic computing device, selection of two or more outstanding loans of the outstanding loans for consolidation;
   performing a benefits analysis for the two or more outstanding loans the user wishes to consolidate;
   based on the benefits analysis, automatically determining whether any of the two or more outstanding loans can be consolidated, and whether any of the two or more outstanding loans are excluded from being consolidated, wherein excluded outstanding loans include loans associated with repayment benefits and loans having a lower interest rate than a consolidated interest rate, including:
      when the two or more outstanding loans can be consolidated, consolidating the two or more outstanding loans into a consolidated loan, and displaying at least one adjustable parameter selected from an estimated monthly payment, the consolidated interest rate, a term, and an estimated total cost of the consolidated loan;
      when any one of the two or more outstanding loans are excluded from being consolidated, automatically excluding any outstanding loan not capable of being consolidated;
      generating an interface including a consolidation group and an exclusion group, the interface including:
         a consolidation tab which, when selected, provides a consolidation listing of the two or more outstanding loans in the consolidation group, the consolidation listing including a first summary for each of the two or more outstanding loans, and the consolidation listing including a control element for one of the two or more outstanding loans which, when selected, includes the one of the two or more outstanding loans in the consolidation group and, when deselected, excludes the one of the two or more outstanding loans from the consolidation group; and
         an exclusion tab which, when selected, provides an exclusion listing of the any outstanding loan in the exclusion group, the exclusion listing including a second summary and an explanation for exclusion for the any outstanding loan;
   receiving an adjustment of the at least one adjustable parameter; and
   displaying, based on the adjustment of the at least one adjustable parameter, loan consolidation information including at least one of a revised interest rate, a revised final total monthly payment amount, and a revised final total cost of the consolidated loan.

2. The method of claim 1, wherein performing the benefits analysis comprises determining whether consolidating the two or more outstanding loans results in a lower cost to the user.

3. The method of claim 2, further comprising determining whether consolidating the two or more outstanding loans results in a lower overall monthly payment for the consolidated loan.

4. The method of claim 2, further comprising determining whether consolidating the two or more outstanding loans results in a lower overall total cost for the consolidated loan.

5. The method of claim 1, further comprising determining whether consolidating any of the two or more outstanding loans would result in a higher cost to the user than not consolidating the two or more outstanding loans.

6. The method of claim 1, wherein determining whether any of the two or more outstanding loans can be consolidated comprises determining whether any benefit from any of the two or more outstanding loans would be forfeited if the two or more outstanding loans were consolidated.

7. The method of claim 1, further comprising:
   determining a dollar amount and a number of months remaining for each of the two or more outstanding loans; and
   adjusting a new monthly amount of the consolidated loan for a type of loan and the term selected based on the dollar amount and the number of months remaining for each of the two or more outstanding loans.

8. The method of claim 1, further comprising creating an exclusion group of loans to be excluded from consolidation.

9. The method of claim 8, further comprising:
   receiving updated loan selections from the user; and
   moving one more loans to or from the exclusion group of loans based on the updated loan selections.

10. A method implemented on an electronic computing device for permitting two or more student loans of a user to be consolidated, the method comprising:
    rendering, on a display screen of the electronic computing device, a user interface that provides information regarding student loans for the user, wherein the information regarding the student loans is received via a structured query language (SQL) query from one or more third party electronic computing devices;
    receiving a selection, via the user interface, of two or more of the student loans for consolidation;
    sending selection information to a server computing device identifying the selection of the two or more student loans for consolidation;
    receiving, from the server computing device, loan consolidation information, the loan consolidation information:

identifying whether the two or more student loans can be consolidated;

providing details regarding a proposed consolidation of the two or more student loans; and automatically excluding the student loans that are associated with repayment benefits and the student loans having a lower interest rate than a consolidated interest rate;

when the two or more student loans can be consolidated, consolidating the two or more student loans into a consolidated loan;

generating, on the user interface, a consolidation group and an exclusion group, the user interface including:

a consolidation tab which, when selected, provides a consolidation listing of the two or more student loans in the consolidation group, the consolidation listing including a first summary for each of the two or more student loans, and the consolidation listing including a control element for one of the two or more outstanding loans which, when selected, includes the two or more student loans in the consolidation group and, when deselected, excludes the two or more student loans from the consolidation group; and an exclusion tab which, when selected, provides an exclusion listing of any student loan in the exclusion group not included in the consolidation group, the exclusion listing including a second summary and an explanation for exclusion for the any student loan;

displaying at least one adjustable parameter selected from an estimated monthly payment, the consolidated interest rate, term, and an estimated total cost of the consolidated loan;

receiving an adjustment of the at least one adjustable parameter; and displaying, on the user interface based upon the adjustment, the loan consolidation information including at least one of a revised interest rate, a revised final total monthly payment amount, and a revised final total cost of the consolidated loan.

11. The method of claim 10, further comprising, displaying a warning when a consolidation of a federal student loan would result in a loss of benefits provided by the federal student loan.

12. The method of claim 11, wherein a loss of the repayment benefits includes a loss of loan forgiveness program.

13. An electronic computing device comprising:

at least one processor; and system memory, the system memory including instructions which, when executed by the processor, cause the electronic computing device to:

receive, via a structured query language (SQL) query, from one or more third party electronic computing devices, information regarding outstanding loans for a user that are issued by one or more third party lenders;

send to a user electronic computing device, the information regarding the outstanding loans for the user issued by the one or more third party lenders and the outstanding loans for the user issued by a financial institution;

receive from the user electronic computing device, selections of two or more of the outstanding loans the user wishes to consolidate;

perform a benefits analysis for the selections of the two or more of the outstanding loans the user wishes to consolidate, the benefits analysis calculating a total cost of each of the two or more outstanding loans before and after consolidation and determining whether any benefits for any of the two or more of the outstanding loans would be lost as a result of consolidation;

based on the benefits analysis, determine whether the total cost of any of the two or more of the outstanding loans would be higher as the result of consolidation;

when a determination is made that the total cost of any of the two or more of the outstanding loans would be higher as the result of consolidation, designate each loan for which the total cost would be higher as a result of consolidating as being excluded from being consolidated;

send consolidated loan information to the user electronic computing device regarding a consolidated loan for two or more of the outstanding loans that can be consolidated;

send exclusion information to the user electronic computing device regarding any of the two or more of the outstanding loans that are excluded from being consolidated, wherein excluded loans include loans associated with repayment benefits and loans having a lower interest rate than a consolidated interest rate;

send benefits information to the user electronic computing device regarding any benefits that would be lost as the result of consolidation;

generate an interface including a consolidation group and an exclusion group, the interface including:

a consolidation tab which, when selected, provides a consolidation listing of the two or more outstanding loans in the consolidation group, the consolidation listing including a first summary for each of the two or more outstanding loans, and the consolidation listing including a control element for one of the two or more outstanding loans which, when selected, includes the one of the two or more outstanding loans in the consolidation group and, when deselected, excludes the one of the two or more outstanding loans from the consolidation group; and an exclusion tab which, when selected, provides an exclusion listing of the excluded loans in the exclusion group, the exclusion listing including a second summary and an explanation for exclusion for the excluded loans;

display at least one adjustable parameter selected from an estimated monthly payment, an interest rate, term, and an estimated total cost of the consolidated loan;

receive an adjustment of the at least one adjustable parameter; and display, based on the adjustment of the at least one adjustable parameter, loan consolidation information including at least one of a revised interest rate, a revised final total monthly payment amount, and a revised final total cost of the consolidated loan.

\* \* \* \* \*